Sept. 7, 1937.  W. STEENBECK  2,092,339
ELECTRIC MOTOR
Filed March 2, 1935
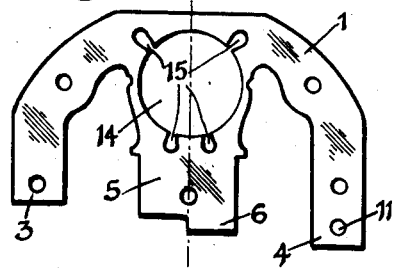
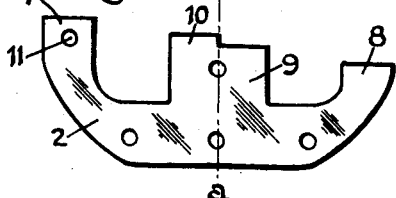
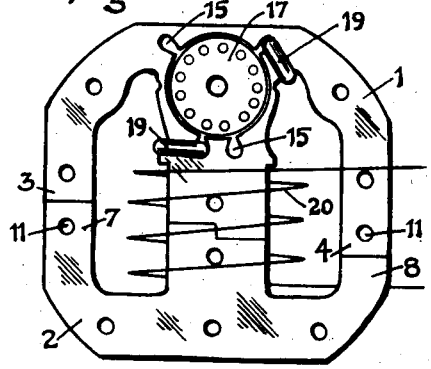
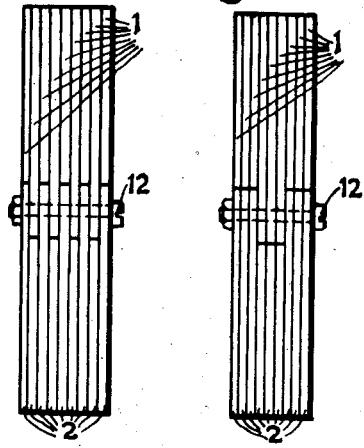
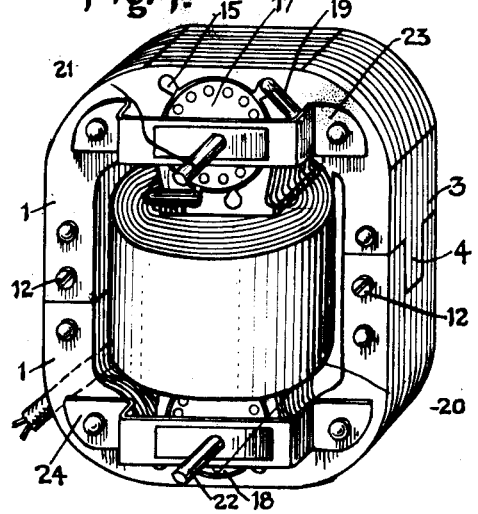
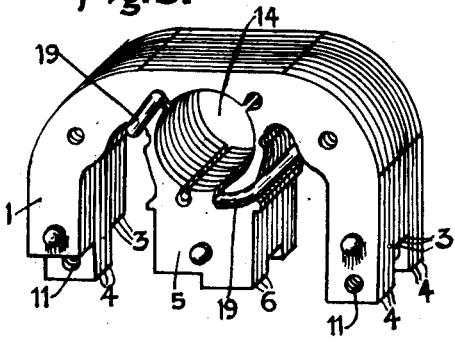
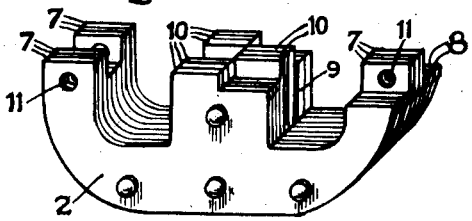
INVENTOR
Wilhelm Steenbeck
BY
Hans W. Hefter
ATTORNEY Patented Sept. 7, 1937

2,092,339

UNITED STATES PATENT OFFICE 2,092,339

ELECTRIC MOTOR

Wilhelm Steenbeck, Hamburg, Germany

Application March 2, 1935, Serial No. 8,995
In Germany March 7, 1934

14 Claims. (Cl. 172—278)

The invention relates to improvements in electric motors and particularly to fractional horse power motors. It is an object of the invention to provide a motor with a field frame composed of sectional stampings of novel design which are economical to produce and can easily be assembled. According to the invention, the stampings comprising the field frame are subdivided and assembled in a novel manner to minimize the stray flux and to permit the employment of a smaller field winding as heretofore.

Another object of the invention is to provide an electric motor with a novel field frame composed of sectional stampings of sheet metal, said stampings being adapted to be assembled in groups in such a manner as to form interengaging recesses and projections at the meeting faces of the assembled groups.

It is also an object of the invention to construct the stampings forming the field frame of the motor in such a way that a stamping provided for a single armature motor may be used for assembling a field frame for a double armature motor in which the armatures are arranged in laterally spaced bores of the frame.

A further object of the invention is to provide a single phase induction motor with a high torque and a series motor characteristic. In particular, it is a very important object of the invention to improve the magnetic and electrical characteristics of two-pole single-phase induction motors provided with a single energizing winding and a short-circuiting ring serving as auxiliary phase. The conventional motors of this type have the disadvantage that owing to the large distance of the energizing winding from the armature and owing to the unpropitious construction of the field frame, the stray flux is very considerable. According to the invention, the energizing winding is arranged in the immediate proximity of the armature in such a way that the symmetry axis of the magnetic field is directed toward the armature and lies with the axis of rotation of said armature in a common plane.

With these and other objects in view, the invention consists in certain construction and combination of parts as will hereinafter be fully described and claimed in the specification and claims and illustrated in the accompanying drawing which forms a part of this application. It is to be understood, however, that while the invention is described as herewith shown, it is not confined to the described examples or designs or the particular type of electric motors, as changes may be made in the construction and combination of parts without departing from the spirit of the invention.

The drawing shows by way of example the invention as applied to a two-pole single-phase induction motor.

Figure 1 is a plan view of a stamping forming one part of the laminated field frame.

Figure 2 is a plan view of a stamping forming another part or the separable yoke part of the field frame.

Figure 3 shows diagrammatically an electric motor of the invention with one armature.

Figure 4 is a perspective view of a modified electric motor provided with two separate armatures.

Figure 5 is a perspective view of the upper part of the field frame of the motor shown in Figure 3.

Figure 6 is a perspective view of the lower part of the field frame of the motor shown in Figure 3, and the Figures 7 and 8 are side views of field frames and show various ways of assembling the sectional stampings.

In accordance with the invention, the field frame is built up of sectional stampings of magnetically permeable sheet metal. In the present instance an upper stamping 1 (Figure 1) and a lower stamping 2 (Figure 2) is used. The illustrated embodiment of the invention is a two-pole single-phase induction motor which may be provided with one or two armatures depending upon the selection of the sectional field frame stampings, whether the field frame is built up of the stampings 1 and 2 to form a single armature motor or whether solely the stampings 1 are used for the upper and lower portion of the field frame to form a double armature motor.

The stamping 1 is provided with a circular aperture 14 adapted to receive the armature 17 and is also provided with a pair of spaced parallel leg portions of different length extending in the same general direction, namely a short leg portion 3 and a long leg portion 4. Between these outer leg portions 3 and 4 and spaced therefrom is arranged a center leg portion 5 extending downwardly from the center portion of the stamping. One longitudinal edge of this center leg portion is longer than the other longitudinal edge to form at the free end of this leg portion a projection 6 which is half as wide as the leg portion 5 and extends horizontally to the vertical center line $a$—$a$ (Figure 1).

The lower stamping 2 is provided with complementary parallel leg portions which extend upwardly and are adapted to abut the free ends of the leg portions 3, 4 and 5 of the upper stamping 1. The lower stamping 2 has an outer longer leg portion 7 for abutting the leg portion 3 and also has an outer short leg portion 8 for abutting the leg portion 4. The center leg portion 9 is provided at its free end with a projection 10 similar to the projection 6 but positioned on the other side of the vertical center line a—a (Figure 2). The leg portions 4 and 7 are provided adjacent their free ends with an aperture 11 to accommodate a bolt 12 or another clamping means for a purpose hereinafter set forth. At the circumference of the bore 14 preferably notches 15 are provided adapted to accommodate short-circuiting rings 19 in a manner as shown in Figures 3 and 4. These short-circuiting rings 19 form the auxiliary phase of the single-phase induction motor. Only one notch 15 is used in each pole face, but two symmetrically arranged notches 15 are provided for each pole to permit reversed application of the stamping during the assembly of the field frame.

The stampings 1 and 2 are each assembled in groups and according to Figures 5 and 6 a plurality of groups of each stamping are then placed upon each other to form an upper field frame part (Figure 5) consisting of stampings 1 and to form a lower field frame part (Figure 6) consisting of stampings 2. As shown in the Figures 5 and 6, the groups of stampings are alternately placed upon each other in reversed position so that the short leg portion of one group lies against the long leg portion of another group. In this way the end faces of the leg portions of the field frame parts are provided with recesses and projections and when the two field frame parts are put together, the projections on one part enter into the recesses of the other part. It is, of course, understood that the previously produced field winding 20 is slipped over one of the center leg portions before the two field frame parts are put together. When the field frame parts are put together, the apertures 11 at the free ends of the interengaging leg portions are in register with each other and then the bolts 12 are inserted to clamp the field frame parts securely together. It will be noted from the Figures 5 and 6 that the center leg portions 5 and 9 are likewise formed with recesses and projections, owing to the provision of the projections 6 and 10 respectively, and that these leg portions 5 and 9 are automatically interconnected with each other when the field frame parts are assembled in the manner described. The Figures 7 and 8 show two different ways of assembling the sectional stampings 1 and 2 respectively. In Figure 7 the stampings are alternately reversed, while in Figure 8 the stampings are reversed alternately in groups as also shown in the Figures 5 and 6.

As shown in Figure 4, the sectional stamping 1 of the present invention lends itself in a very convenient and practical manner to a construction of a motor having two separate armatures. All that is necessary is to employ instead of the yoke forming stampings 2 another set of stampings 1 to form the lower part of the field frame. In this way a field frame is produced having two laterally spaced apertures for the reception of two independent armatures 17 and 18 whose shafts 21 and 22 are rotatably mounted in bearing brackets 23 and 24 secured in any desired manner to the end faces of the field frame or if desired to any other supporting structure combined with the field frame.

This double-armature motor has the substantial advantage that the power output and the starting torque of the motor is doubled by only a small increase in power input. The efficiency of such a double-armature motor may be improved substantially when both armatures by means of suitable gears or the like are employed to drive a common drive shaft. Of course, both armatures may each drive a separate shaft and the motor then does the same work as two independent motors. This advantage is particularly of value in the art of fractional horse power motors of the two-pole induction type. Electric motors of this type, owing to its magnetic leakage, have characteristics very similar to a series wound motor, namely, a high starting torque and a slowly descending torque with increase of speed up to a subsynchronous speed which is determined to a certain extent by the armature resistance and the straying effect. A break-down torque which is so pronounced in four-pole induction motors is not noticeable in a motor of the present invention.

The preferred and described embodiments of the invention result in various other constructive advantages among which are that a ready wound field coil can be put on the center leg after the armature and the bearings therefor have been installed. The field coil can be readily exchanged by merely removing the clamping bolts 12 and separating the field frame sections, without disturbing the armature and the bearings. Furthermore, the stampings are symmetrical and may be used for the construction of a single-armature motor or a double-armature motor.

It is obvious that various changes in the details of constructions, in the type of stampings, and in the combination of parts may be resorted to without departing from the spirit of the invention and the appended claims. I claim as my invention and desire to secure by Letters Patent:

1. In an electric motor, a field frame comprising stampings of magnetically permeable sheet metal provided with a plurality of laterally spaced armature apertures the axes of which are parallel to each other said stampings being assembled to form a closed magnetic circuit, a plurality of armatures, one for each of said armature apertures said field frame having a leg-like portion the longitudinal axis of which intersects the centers of said armature bores, and energizing means on said leg-like portion.

2. In an electric motor, a field frame comprising stampings of magnetically permeable sheet metal provided with two laterally spaced armature bores the axes of which are parallel to each other, an armature in each of said bores, said stampings being provided with three spaced parallel legs, the axis of the center leg being vertical to the axes of said armature bores, and a field winding on said center leg.

3. A field frame for an electric motor comprising sectional stampings of sheet metal, each section being provided with a plurality of spaced parallel leg portions and with a circular aperture adapted to receive an armature the wall of each aperture forming consecutive pole faces which are permanently connected with each other, said sections being assembled in groups with the free ends of the leg portions of said groups in abutting relation to form a frame having two laterally spaced cylindrical bores each being adapted to receive an armature, one of the leg portions of said sections extending with its longitudinal axis through the centers of said circular apertures, said last named leg portion being provided for receiving an energizing winding.

4. A field frame for an electric motor, comprising sectional stampings of sheet metal, one section of said stampings being provided with three spaced parallel leg portions and a circular aperture adapted to receive an armature, one of the outer leg portions being longer than the other, the sections being assembled in groups, one group being placed with its short leg portion upon the long leg portion of another group of sections whereby projections and recesses are formed at the free ends of the outer leg portions of the assembled stampings, another section of said stampings forming a yoke having three leg portions in alinement with the leg portions of said first mentioned section, one outer leg portion of said yoke being longer than the other outer leg portion, the yoke forming sections being assembled in groups similarly as the first mentioned sections, the projections and recesses formed thus at the free ends of the leg portions of the assembled yoke stampings interengage with the recesses and projections on the leg portions of the assembled stampings of the first mentioned sections.

5. A field frame for an electric motor as set forth in claim 4, in which the center leg portion of the first mentioned sections and of the yoke sections is provided with an offset meeting edge adapted to provide interengaging recesses and projections on the abutting faces of the center leg portions of the assembled stampings.

6. A field frame for an electric motor, comprising sectional stampings of sheet metal, each section being provided with three spaced parallel leg portions extending in the same general direction and with a circular aperture adapted to receive an armature, the wall of said aperture forming consecutive pole faces which are permanently connected with each other the outer leg portions being of different length, said sections being assembled in groups, one group being placed with its shorter leg portion upon the longer leg portion of another group whereby the free ends of the outer leg portions of a plurality of assembled groups of sections are formed with recesses and projections, the free ends of the leg portions of two of such assembled groups of sections being arranged in interengaging and abutting relation to form a frame having two laterally spaced cylindrical bores adapted to receive each an armature.

7. A field frame for an electric motor as set forth in claim 6, in which the center leg portions of said sectional stampings are enlarged at their ends which are positioned adjacent the circular aperture to form lateral shoulders adapted to support a winding which is placed on the center portion of the center leg formed by two alined leg portions.

8. A field frame for an electric motor, comprising sectional stampings of sheet metal, one section of said stampings being provided with three parallel legs and a circular aperture adapted to receive an armature, one of the outer legs being longer than the other, the sections being assembled in groups, one group being placed with its short leg upon the long leg of another group of sections, whereby projections and recesses are formed at the free ends of the outer legs of the assembled sections, another section of said stampings forming a yoke having portions abutting the legs of said first mentioned section, one outer portion of said yoke being formed differentially from the other outer portion, the yoke forming sections being assembled in groups similarly as the first mentioned sections, the projections and recesses thus formed at the outer portions of the assembled yoke sections interengage with the recess and projections on the legs of the assembled first mentioned sections.

9. In an electric motor, a field frame comprising an endless frame-like formation and a cross-bar subdividing the frame-like formation, said field frame having an aperture at each juncture of the cross-bar with the frame-like formation, an armature in each aperture, and winding on said cross-bar between said apertures.

10. In an electric motor, a field frame comprising an endless frame-like formation and a cross-bar subdividing the frame-like formation, said field frame having an aperture at each juncture of the cross-bar with the frame-like formation, an armature in each aperture, the cross-bar being of considerable smaller cross section in its center portion than at the points of juncture, and a winding on the center portion of said cross-bar.

11. In an electric motor, a field frame comprising an endless frame-like formation and a cross-bar subdividing the frame-like formation, said field frame being provided with an aperture at each juncture of the cross-bar with the frame-like formation, an armature in each aperture the whole field frame structure being detachably connected to permit a winding to be slid on said cross-bar.

12. In an electric motor, a field frame composed of two identical three-legged portions each provided with an armature bore the ends of the legs of said portions overlappingly engaging each other, an armature carried fully by each of said portions, and an energizing winding, arranged on two abutting leg portions and adapted to energize both field frame portions simultaneously.

13. In an electric motor, a field frame provided with two apertures, a magnet core section whose longitudinal axis intersects the axis of both said apertures, an armature in each aperture, energizing means on said magnet core section for producing the total magnetic flux which traverses both armatures in series and divides its path within said armatures in two branches, and means forming separate return paths in said field frame for each flux branch.

14. In an electric motor, a field frame consisting of two similar separable sections forming together a closed magnet circuit, each section being provided with an enlarged portion in which an armature bore is arranged, the wall of said bore forming continuous and consecutive pole faces, each section being further provided with spaced parallel leg-like portions the free ends of which are in abutting relation to form complete legs extending at a right angle to the axis of said armature bores, an energizing coil adapted to be mounted upon one of said leg-like portions of either said sections prior to assembling the same, and an armature in each of said armature bores.

WILHELM STEENBECK.